United States Patent [19] … [11] Patent Number: 5,000,871
Minayoshi et al. … [45] Date of Patent: Mar. 19, 1991

[54] GYCOL DISPERSION OF CALCIUM CARBONATE

[75] Inventors: Shiro Minayoshi; Naofumi Saitoh; Toshio Higashi; Noritsugu Ebisuya, all of Akashi, Japan

[73] Assignee: Maruo Calcium Company Limited, Akashi, Japan

[21] Appl. No.: 209,393

[22] Filed: Jun. 21, 1988

[30] Foreign Application Priority Data

Jun. 24, 1987 [JP] Japan ................................. 62-157379
Jun. 24, 1987 [JP] Japan ................................. 62-157380

[51] Int. Cl.$^5$ ............................................. B01J 13/00
[52] U.S. Cl. ..................................... 252/309; 524/425
[58] Field of Search ........................... 252/309, 315.2; 524/425; 106/463, 464; 423/430, 161

[56] References Cited

U.S. PATENT DOCUMENTS 4,693,932  9/1987  Kuze et al. ............................ 524/425
4,727,108  2/1988  Kagiyama et al. ................... 524/425

OTHER PUBLICATIONS

Derwent Abstract, C85-057874.
Patent Abstracts of Japan, vol. 9, No. 205, 60-71632(A).

Primary Examiner—Richard D. Lovering
Assistant Examiner—Daniel S. Metzmaier
Attorney, Agent, or Firm—Armstrong, Nikaido Marmelstein Kubovcik, & Murray

[57] ABSTRACT

The present invention provides a glycol dispersion consisting of calcium carbonate and glycol prepared by wet grinding a glycol slurry composed of glycol and calcium carbonate surface-treated with at least one of surface treating agents selected from the group consisting of copolymers (A) of at least one of α, β-monoethylenically unsaturated carboxylic acids and their salts with α, β-monoethylenically unsaturated carboxylic acid esters and salts (B) of copolymers of α, β-monoethylencially unsaturated carboxylic acids with α, β-monoethylencially unsaturated carboxylic acid esters as material for wet grinding. The glycol dispersion of the present invention is good in dispersion stability in glycol as well as affinity with polyester and contributes to improvement of the surface properties of polyester. Furthermore, proper selection of a specific grade of calcium carbonate and specific grinding conditions enable provision of highly functional polyester products.

3 Claims, 5 Drawing Sheets

WET GRINDING

WET GRINDING

WET GRINDING

WET GRINDING

GYCOL DISPERSION OF CALCIUM CARBONATE

BACKGROUND OF THE INVENTION

1. Field of the Invention

The present invention relates to a glycol dispersion of calcium carbonate. More particularly it relates to a dispersion in glycol such as ethylene glycol of calcium carbonate which is used as a material in the manufacture of polyester which is used as material of especially films or fibers, for the purpose of improving polyester's friction coefficient, wherein the glycol dispersion of calcium carbonate comprises a grade of calcium carbonate having a good dispersion stability in glycol and a good affinity with polyester and glycol such as ethylene glycol, propylene glycol and butylene glycol.

2. Description of the Prior Art

Polyester manufactured today commercially, polyethylene terephthalate (hereinafter called "PET") in particular, has excellent physical and chemical properties, and is being widely used for manufacture of fibers, films and other moldings.

Meanwhile, however, it is known that it has a shortcoming of lacking in sliding property in the process of molding, further processing and handling of manufactured articles, this interfering with the workability and resulting in lowering of the commercial values of the products. And, these troubles are mostly attributable to the high friction coefficient of polyester itself. To overcome such troubles, there have been proposed to date many methods which essentially consist in incorporating fine particles in polyester and imparting a proper degree of roughness to the surface of a molded article to thereby improve the surface sliding property thereof. The affinity between such fine particles and polyester is, however, insufficient, hence there was invariably something to be desired about the transparency and wear resistance of films, fibers et cetera manufactured by such methods.

As means of improving the surface properties of polyester have been hitherto known, among others, the following:

(1) a method of separating out a part or whole of the catalyst et cetera used for synthesis of polyester in the reaction process (internal particle separating-out method)

(2) a method of adding fine particles of calcium carbonate, silicon dioxide et cetera in the course of or after polymerization (external particle adding method)

The internal particle separating-out method (1) has a drawback of having difficulty in controlling the amount and size of particles and in preventing the formation of coarse particles because in this method particles are to be formed during reaction, although the affinity between polyester and particles is somewhat good, for such particles consist of a metallic salt of a polyester component.

The external particle adding method (2), which consists in adding fine particles of an inorganic compound insoluble in and inert to polyester such as titanium dioxide, silica, talc, kaolin and calcium carbonate during or after polymerization, is superior to the method (1) described above with regard to improvement of sliding property, if the particle size and the amount of addition of the inorganic compound are properly selected and coarse particles are removed by classification or the like in advance. However, the affinity between inorganic particles and polyester as an organic substance is insufficient hence separation occurs in the interface boundary between particles and polyester in the course of stretching et cetera, this causing problems about transparency and wear resistance which are still to be solved. For improvement of this affinity between the inorganic compound and polyester, there has been proposed a method of surface treatment by coupling reaction between a silane compound and a titanate compound, but this method, too, has various problems such as the complicated process involved and the fact that the effect attainable is not so good as expected.

Also, for improvement of dispersibility in polyester of such inorganic compound there is proposed a method of preparing glycol slurry of fine particles of the inorganic compound and adding it in the process of polyester manufacture, but there is something to be desired about the dispersibility as well as long-term dispersion stability of such inorganic compound in glycol, hence, when the glycol with such inorganic compound in fine powder form suspended therein is stored for a long period, there are problems of such inorganic compound precipitated to form deposits or hard cakes which are difficult to redisperse or fine particles of such inorganic compound agglomerating in glycol or in the course of manufacture of polyester. The presence of agglomerated coarse particles in polyester can cause yarn breakage in the spinning process, formation of the so-called "fish eye" et cetera and, in particular, drop-out or lowering of S/N ratio when it is used for manufacture of film for magnetic tape, and there has been a strong need for development of fine particles free from formation of coarse particles.

SUMMARY OF THE INVENTION

It is a primary object of the present invention to provide a glycol dispersion of calcium carbonate having a good dispersion stability and a good affinity with polyester.

Another object of the present invention is to provide a glycol dispersion of calcium carbonate having a good dispersion stability, having a good affinity with polyester, being uniform in particle size, being sharp in particle size distribution and having its particle size freely selectable.

Further objects and advantages of the present invention will become apparent for those skilled in the art from the detailed description and explanation given below.

After extensive and intensive studies in order to attain the aforementioned objects, the present inventors have discovered that a grade of calcium carbonate having a good dispersion stability in glycol and a good affinity with polyester can be obtained by wet grinding in glycol calcium carbonate surface-treated with a treating agent of a special composition and thus completed the present invention.

DETAILED DESCRIPTION OF THE INVENTION

Figure 1:
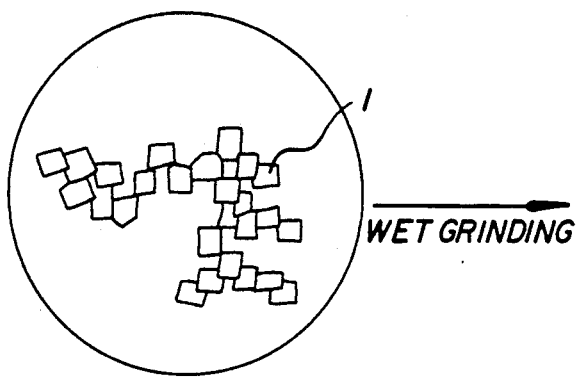
FIGS. 1 and 2 are schematic views showing the method of wet grinding precipitated calcium carbonate.

The present invention relates to a glycol despersion of calcium carbonate prepared by wet grinding a glycol slurry composed of glycol and calcium carbonate whose surface was treated with a copolymer (A) of at least one of $\alpha$, $\beta$-monoethylenically unsaturated carboxylic acids and their salts with $\alpha$, $\beta$-monoethylenically unsaturated carboxylic acid esters and/or a salt (B) of a copolymer of $\alpha$, $\beta$-monoethylenically unsaturated carboxylic acids with $\alpha$, $\beta$-monoethylenically unsaturated carboxylic acid esters (B).

The surface treating agents of specific compositions comprise at least one of copolymers of $\alpha$, $\beta$-monoethylenically unsaturated carboxylic acids or alkali metal salts, alkali earth metal salts, ammonium salts, amine salts et cetera obtained by neutralizing the carboxylic groups of $\alpha$, $\beta$-monoethylenically unsaturated carboxylic acids with $\alpha$, $\beta$-monoethylenically unsaturated carboxylic acid esters and the aforesaid salts of copolymers of $\alpha$, $\beta$-monoethylenically unsaturated carboxylic acids with $\alpha$, $\beta$-monoethylenically unsaturated carboxylic acid esters, and these can be used either alone or in combination.

The $\alpha$, $\beta$-monoethylenically unsaturated carboxylic acids referred to in the present invention are at least one selected from $\alpha$, $\beta$-unsaturated monocarboxylic acids such as acrylic acid, methacrylic acid and crotonic acid and $\alpha$, $\beta$-unsaturated dicarboxylic acid such as maleic acid, fumaric acid and itaconic acid. As typical examples of $\alpha$, $\beta$-monoethylenically unsaturated carboxylic acid esters there may be included acrylic acid, methacrylic acid and other alkyl esters, acrylates and methacrylates having alkoxy groups, acrylates and methacrylates having cyclohexyl group, acrylates and methacrylates having hydroxyl groups, polyalkylene glycol monoacrylates, monomethacrylates, and acrylates and methacrylates having aromatic groups, and at least one of $\alpha$, $\beta$-monoethylenically unsaturated carboxylic acid esters may be used.

The calcium carbonates used in the present invention are roughly classified into two types in general, namely ground calcium carbonate and precipitated calcium carbonate (synthetic calcium carbonate).

The ground calcium carbonate is manufactured by mechanically pulverizing limestone and by subsequently classifying the resulting powder into various grades. This has an advantage of being relatively low in manufacturing cost, but has defects of being broad in particle size distribution and a powder fineness beyond a certain limit being unattainable by the present level of pulverizing and classifying technique.

In contrast thereto, precipitated calcium carbonate is a synthetic one manufactured by alternative chemical processes, for example, the carbon dioxide process in which calcium carbonate is made by letting quick lime obtained by calcining limestone at a high temperature react with water to prepare lime of milk, and then passing the carbon dioxide generated when limestone is calcined through the milk of lime, the lime soda process in which the milk of lime is caused to react with sodium carbonate, and the soda process in which calcium chloride is caused to react with sodium carbonate. Although there are some differences depending on the process adopted, precipitated calcium carbonate is generally sharper in particle size distribution than ground calcium carbonate, allowing free selection of the desired particle size (primary particle size).

According to the present invention, with precipitated calcium carbonate or ground calcium carbonate, it is possible to accomplish the objects of the invention, namely:

(i) manufacture of calcium carbonate good in dispersibility as well as long-term dispersion stability in glycol, and (ii) manufacture of calcium carbonate having a good affinity with polyester and having a little risk of separation in the interfacial boundary between such particles and polyester and is safe from formation of voids.

Hence, either type of calcium carbonate may be selected with the intended use, economy, desired particle size et cetera taken into due consideration.

For instance, the product manufactured according to the present invention with ground calcium carbonate as material may well be useful for the manufacture of relatively thick polyester film for audio tape, food packaging film et cetera of the standard grade. Especially food packaging film with its specific nature is required to be high in transparency despite the restriction with regard to price quite severe compared with other PET films used in other fields.

When cheap, large-sized particles are used for this kind of film, large voids are formed due to insufficient affinity between polyester resin and such inorganic particles, and diffusion of light on the film surface is increased to markedly interfere with transparency, hence has been accepted to be difficult to use inorganic particles for sufficient improvement of friction coefficient in the process of molding and subsequent processing of films. When the present invention is applied to manufacture of food packaging films, it is possible to use inorganic particles sufficient for improvement of the film's friction coefficient without undue drop of transparency of film even when calcium carbonate of a relative large particle size is used, since the affinity between calcium carbonate and polyester resin is improved.

According to the present invention, there are roughly the following two alternatives as the method of treating calcium carbonate particles with a surface treating agent.

(1) Dry Treating Method

A method of manufacturing surface-treated particles of calcium carbonate consisting in that pulverized calcium carbonate is charged into a treating vessel provided with rotatory stirring blades such as Henschel mixer and stirred intensively, and an aqueous or organic solvent dilute solution of a surface treating agent is dripped into the powder for dry surface treatment of the particles.

(2) Wet Treating Method

A method of manufacturing surface-treated particles of calcium carbonate consisting in that an aqueous or organic solvent dilute solution of a surface treating agent is added to a concentrated aqueous suspension of ground calcium carbonate, concentrated aqueous suspension of precipitated calcium carbonate or water-containing press cake and subsequently powerfully agitated to prepare a concentrated slurry of surface-treated calcium carbonate and further, if necessary, the concentrated surface-treated calcium carbonate slurry is passed through a wet grinder such as sand grinder for still more powerful surface-treatment and then the above-mentioned surface-treated concentrated calcium carbonate is dried in a dryer such as drum dryer and pulverized by a grinder.

Although the objects of the present invention is attainable by either of the above-mentioned two methods, it is preferred to use the (2) wet treating method for better accomplishment of the objects of the present invention by uniformly treating the surface of particles of calcium carbonate with the surface treating agent.

Although the surface treating agent used for surface-treatment of calcium carbonate particles by these methods is as described above, it is desirous that powerful bondage by chemical reaction takes place between the surface treating agent and the surface of calcium carbonate particles for still more effective surface-treatment thereof, hence preference is given to surface-treating agents having residues of active carboxyl groups reactive with calcium carbonate, namely with alkali metal salts, alkali earth metal salts, ammonium salts, amine salts et cetera of $\alpha, \beta$-monoethylenically unsaturated carboxylic acid to be copolymerized with $\alpha, \beta$-monoethylenically unsaturated carboxylic acid esters, the total amount of carboxyl groups neutralized with alkali metals, alkali earth metals, ammonium, amine et cetera is less than 100%, preferably not more than 90%, of the total carboxyl groups contained in the aforesaid copolymers. The same also applies to where copolymers of $\alpha, \beta$-monoethylenically unsaturated carboxylic acid with its esters are neutralized to salts.

Also, the proportion of the $\alpha, \beta$-monoethylenically unsaturated carboxylic acid esters to the copolymer as a whole is preferably not less than 2 mol % and not more than 95 mol %. No sufficiently satisfactory result may be obtainable when this proportion is less than 2 mol % with respect to affinity between calcium carbonate and polyester, and when it is in excess of 95 mol % with respect to the dispersion stability of the surface-treated concentrated aqueous slurry of calcium carbonate in processing by the aforesaid surface treating method (2).

As to the required amount of the surface treating agent, it is preferred to be not less than 0.01 weight % and not more than 30 weight % (as 100% pure) and no sufficiently satisfactory result may be attainable when it is less than 0.01 weight % with respect to treating effect, and when it is in excess of 30 weight % with respect to cost, also possibly adversely affecting the quality of polyester itself.

Further, although there is no particular limitation with respect to the temperature at which calcium carbonate particles are treated with such surface treating agent, the treating temperature may at least be not less than 30° C. and preferably not less than 50° C. for improved surface treating effect. For raising the surface treating temperature any of the known methods may be used, for example, when the treating method (1) is used, by passing hot water, steam or the like through the external jacket of the treating vessel such as Henschel mixer and, when the treating method (2) is used, by external heating of surface-treated calcium carbonate slurry.

The calcium carbonate particles surface-treated by any of the aforesaid methods are then mixed under stirring with glycol used as a material in the manufacture of polyester such as ethylene glycol, propylene glycol and butylene glycol for preparation of a glycol suspension of calcium carbonate, this glycol suspension is then passed through a wet grinder for grinding and dispersing calcium carbonate and the glycol suspension of calcium carbonate of the present invention is thus prepared. As to the solid concentration of calcium carbonate in such glycol suspension, there is no particular limitation but it is considered desirous to be not less than 20 weight % and not more than 80 weight % with cost, grinding efficiency and viscosity of glycol suspension or the like taken into consideration.

The wet-type grinder used for wet grinding in the process of the present invention is a device for grinding the dispersion of the material to be treated under reflux or being passed therethrough under mechanical stirring by means of discs, bars, screw or the like with natural or synthetic minute particles of mineral sand, minute particles of hard glass, hard plastic, metal or the like filled as media in the vessel of the device such as attritor, Dyno-mill and universal mill. The average diameter of the aforesaid minute particles used in wet-type grinders may preferably be not more than approximately 5 mm.

Nor is there any particular limitation with respect to the ocnditions for grinding and dispersing glycol suspension, and the solid concentration of glycol suspension, the revolutions per minutes of the agitating blades of the wet-type grinder, the media charging rate, the feeding rate of glycol dispersion etc. may be adjusted properly.

The glycol dispersion of calcium carbonate prepared by the method of the present invention is not only good in the dispersion stability of calcium carbonate in glycol but also is extremely good in affinity between calcium carbonate contained in a polyester product manufactured with this as material.

In order to meet the progressively various needs of the advanced society lately, however, studies are being made for development of new materials having higher functions in many fields and polyester, PTE film in particular, is no exception.

Keeping pace with the spread of high quality audio system and high fidelity video deck, still higher audio and video properties are being requested by users in general, and as to the tapes used, too, the requirements are getting higher from the standard grade to a high grade and even to a super-high grade. Also, 8 mm video deck has meanwhile appeared on the market and the PET film used as material of the magnetic tape therefor is required to be extremely thin as hitherto unexperienced, to have a still higher surface smoothness and also good surface slidability, these being contradictory physical properties.

To manufacture such highly functional polyester film to meet the needs of an advanced society, that is, polyester film having a high slidability despite its extremely small film thickness and high surface smoothness, it is necessary to create a very fine and uniform irregularity in the film's surface and, in order to accomplish this object, the inorganic particles used in the process of polymerizing polyester are required further to have the following properties in addition to those described above in connection with the objects (i) and (ii) of the present invention:
(iii) inorganic particles uniform in size or diameter,
(iv) inorganic particles not containing unecessary particles such as coarse or ultrafine particles, being sharp in particle size distribution in glycol, and
(v) inorganic particles whose size is freely selectable.

Ground calcium carbonate, however, has the following major shortcomings when it is used in the manufacture of high-function polyester films et cetera.

Hitherto, when a commercially available grade of ground calcium carbonate is used for manufacture of polyester products, often and generally used are the methods (1) and (2) described below.

(1) A method wherein a commercially available grade of ground calcium carbonate or ground calcium carbonate was surface-treated with fatty acid, resin acid or alkali metal salts thereof, air classified repeatedly for elimination of coarse particles not less than 5 μm in particle size, and then dispersed in glycol.

(2) A method wherein a commercially available grade of ground calcium carbonate was dispersed in glycol and then, after being subjected to wet-grinding by a wet grinder such as sand mill, it is wet classified for elimination of coarse particles not less than approximately 3 μm in particle size.

Figure 8:
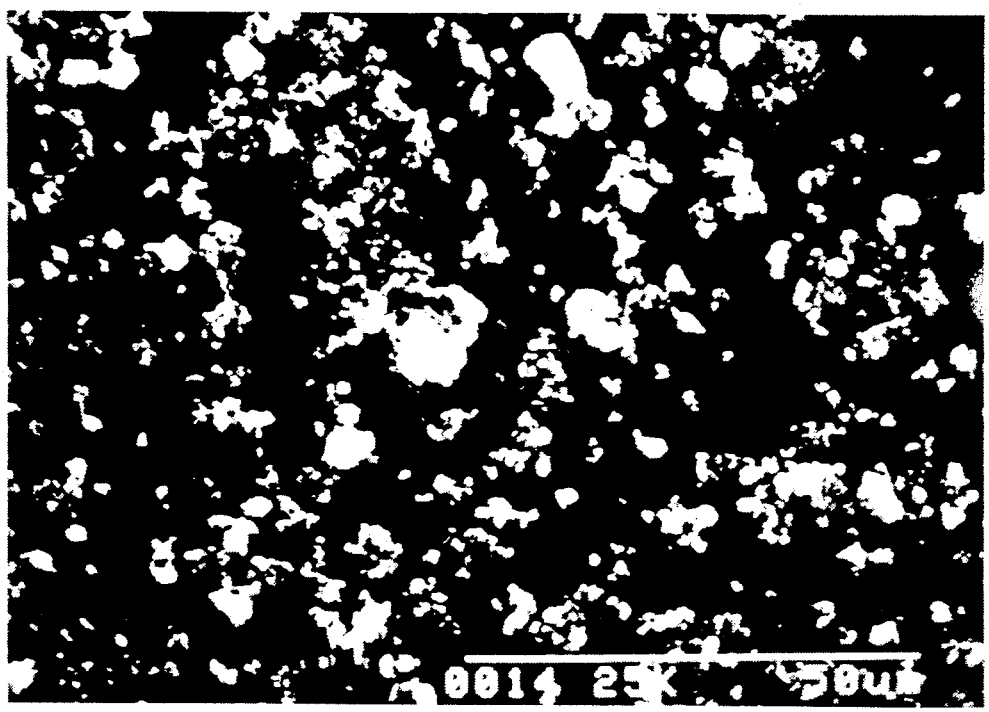
FIGS. 8 through 16 are electron microscopic pictures showing the particle structure of calcium carbonate.

In case of (1);

(a) Even if a particularly fine grade of commercially available ground calcium carbonate is chosen and air classified, its particle size distribution before classification is very broad, having coarse particles of approximately 4–6 μm in size contained therein as shown in FIG. 8. Even if a commercially available air classifier of the highest performance is used and classification is done repeatedly, it is difficult to perfectly eliminate coarse particles up to 3 μm in size. An electron microscopic picture (×1,000) of a particularly fine grade of commercially available ground calcium carbonate (Super #2300, manufactured by Maruo Calcium Co., Ltd) is shown in FIG. 8.

(b) When ground calcium carbonate is surface-treated with fatty acid, resin acid or an alkali metal salt thereof for improving air classification efficiency, dispersion stability in glycol is adversely affected due to poor compatibility between such surface-treating agents and glycol.

(c) Since there is a limit to the fineness of commercially available grades of ground calcium carbonate, preparation of calcium carbonate of the desired particle size is impossible even by most elaborate air classification.

In case of (2);

(a) Since ground calcium carbonate as material is attritionally ground by the use of a wet-type grinder, it is relatively easy to obtain calcium carbonate of the desired average particle size compared with any of the methods described above under (1) but, since the mode of grinding is attritional, an increased amount of particles of unnecessary fineness results to broaden the particle size distribution. This means undesirable decrease of the absolute quantity of calcium carbonate contributing to improvement of frictional properties of polyester, which is a major object of the present invention, and, worse, such ultrafine particles tend to reagglomerate in glycol to form coarse secondary particles, thus possibly deteriorating the physical properties of polyester films or polyester fibers.

(b) Even when wet grinding is performed with ground calcium carbonate as material, it is possible that part of the coarse particles 4–6 μm in size contained in the material ground calcium carbonate remain in the calcium carbonate after grinding due to a phenomenon called "short pass" (a phenomenon of coarse particles in the material to be ground are discharged from a wet-type grinder substantially unground) and even if an attempt is made for elimination of such coarse particles by the use of a wet-type centrifugal classifier, the size of particles which can be eliminated in an economically acceptable manner is down to approximately 1 μm.

It is, therefore, not considered to be advisable to use ground calcium carbonate as material in preparing a glycol dispersion of the present invention for use in the manufacture of the aforesaid highly functional polyester film et cetera, and as material it is advisable to select a grade of precipitated calcium carbonate of a specific dispersibility and particle size (distribution). A high grade of calcium carbonate which is truly good for the manufacture of highly functional polyester films et cetera can only be prepared by wet grinding in glycol under specific conditions the aforesaid grade of precipitated calcium carbonate surface-treated with a treating agent of a specific composition according to the present invention.

Described below in detail is the method of preparing the aforesaid high grade calcium carbonate.

The high grade calcium carbonate good for use in the manufacture of highly functional polyester films et cetera according to the present invention is a glycol dispersion of precipitated calcium carbonate consisting of glycol and precipitated calcium carbonate meeting the requirements described below under (a) and (b) and surface-treated with a surface-treating agent of the present invention composed of a copolymer (A) and/or a salt of copolymer (B), mixing the so surface-treated calcium carbonate with glycol to form a glycol slurry and then wet-grinding it under conditions meeting the requirements described below under (c).

(a) The primary particle size $D_1$ calculated by the following formula (1) from the specific surface area $S_1$ measured by the BET method shall be not less than 0.1 μm.

$$Dx = 60,000/2.7Sx \quad (1)$$

Where:

$Dx$ = the average particle size (μm) of precipitated calcium carbonate calculated from the specific surface area measured by the BET method.

$Sx$ = the specific surface area (cm$^2$/g) of precipitated calcium carbonate measured by the BET method.

(b) The ratio $R_1$ of the 50% weight average particle size $d_1$ of the particle size distribution measured in an aqueous system by the use of Light Transmission Centrifugal Precipitation-type Particle Size Distribution Measuring Device SA-CP-2 (manufactured by Shimazu Seisakusho Ltd.) to the above-mentioned value $D_1$ shall satisfy the following formula (2).

$$R_1 = d_1/D_1 \leq 7 \quad (2)$$

(c) The ratio $R_2$ of the above-mentioned primary particle size $D_1$ to the primary particle size $D_2$ calculated by the above-mentioned formula (1) from the specific surface area $S_2$ of precipitated calcium carbonate measured by the BET method shall satisfy the following formula (3).

$$R_2 = D_1/D_2, \quad 1 < R_2 \leq 10 \quad (3)$$

A first feature of the aforesaid glycol dispersion of precipitated calcium carbonate referred to as high grade calcium carbonate consists in the composition of the specific surface treating agent, as already mentioned above.

A second feature consists in that as material to be wet-ground is precipitated calcium carbonate of specific range of particle size and dispersibility. Using precipitated calcium carbonate of a specific dispersibility and range of particle size as material for grinding has the following advantages compared with the use of ground calcium carbonate therefor;

The schematic views of the shapes of particles before and after grinding when precipitated calcium carbonate and ground calcium carbonate are used as material to be wet-ground respectively are shown in FIGS. 1, 2, 3 and 4.

Figure 2:
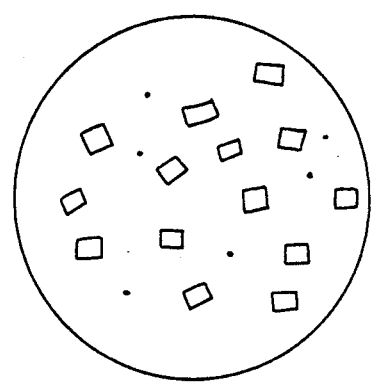
Figure 3:
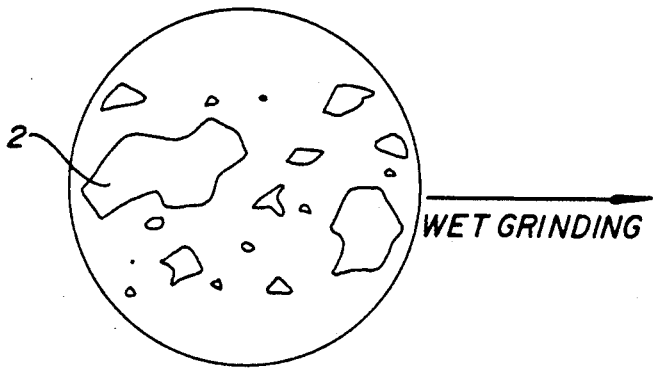
FIGS. 3 and 4 are further schematic views showing the a method of wet grinding ground calcium carbonate.
Figure 4:
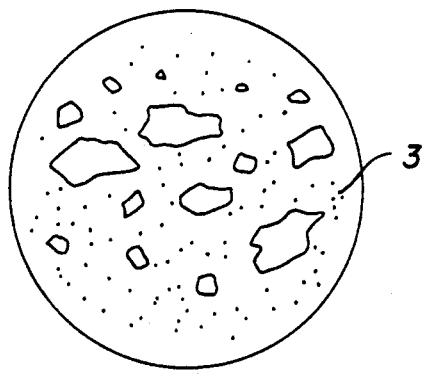

As shown in FIG. 1, when precipitated calcium carbonate of more than a given dispersibility is used, the grinding energy applied to the calcium carbonate particles in the wet grinding process is first consumed for breaking and dispersing the agglomeration of the primary particles of weak bonding power since the precipitated calcium carbonate is in the form of soft agglomerates of primary particles (1) substantially uniform in particle size and, unless too powerful wet grinding is continued for a too long time, there is little risk of the individual primary particles (1) being broken or unnecessary ultrafine particles being formed. As a result, as shown in FIG. 2, calcium carbonate uniform in particle size and sharp in particle size distribution as shown in FIG. in 2 is obtainable. In contrast thereto, when ground calcium carbonate is used as material to be ground, as shown in FIGS. 3 and 4, the grinding energy applied to calcium carbonate particles in the wet grinding process is partly used for disintegrating and grinding them into coarse primary particles made up of more than one coarse primary particle (2), but since breaking and grinding of the coarse primary particles require quite a lot of grinding energy, it is likely that the grinding energy applied is consumed for superficially grinding the coarse primary particles (2) to give rise to a large amount of unnecessarily fine particles (3).

As is apparent from the above, the use of precipitated calcium carbonate of a specific range of particle size and a specific degree of dispersion allows preparation of calcium carbonate particles substantially uniform in particle size and sharp in particle size distribution compared with where ground calcium carbonate is used as material.

According to the present invention, the primary particle size of precipitated calcium carbonate used as material to be wet-ground may be acceptable if the diameter $D_1$ of its primary particle calculated by the following formula (1) from the specific surface area $S_1$ measured by the BET method is not less than 0.1 μm.

$$D_x = 60,000/2.7S_x \quad (1)$$

Where:

$D_x$ = Average particle size (μm) of precipitated calcium carbonate calculated from the specific surface area measured by the BET method: and $S_x$ = Specific surface area (cm$^2$/g) of precipitated calcium carbonate measured by the BET method.

When the diameter of the primary particle of precipitated calcium carbonate used as material to be wet-ground is less than 0.1 μm, larger secondary particles (each being an agglomerate of the primary particles) due to the increased agglomerating potential between the primary particles, and these secondary particles are difficult to disintegrate and redisperse even by economically acceptable repeated grinding and, worse, since the grinding energy applied is not solely used for disintegrating agglomerates but also for attritively breaking the primary particles, this resulting in an increased unevenness of the size of primary particles.

As to the degree of dispersion of precipitated calcium carbonate to be used as material to be ground, the ratio $R_1$ of the 50% weight average particle size $d_1$ for the particle size distribution measured in an aqueous system by the use of Light Transmission Centrifugal Precipitation-type Particle Size Distribution Measuring Device to the diameter of the primary particle $D_1$ calculated from the specific surface area $S_1$ measured of precipitated calcium carbonate by the BET method may be acceptable if $R_1 = d_1/D_1$, $R_1 \leq 7$, preferably $R_1 \leq 4$. If a grade of precipitaed calcium carbonate, whose $R_1$ is in excess of 7, is used as material to be wet-ground, such precipitated calcium carbonate is composed of large and firmly agglomerated secondary particles, hence the secondary particles cannot be easily disintegrated and redispersed in the process of wet grinding and as in the case where ground calcium carbonate is used as meterial to be wet-ground, the ground matter is a mixture comprising both coarse secondary particles and unnecessarily finely ground ultra-fine particles, and thus the object of the present invention to provide a high grade calcium carbonate good for use in the manufacture of highly functional polyester films et cetera cannot be attained.

A third feature of the present invention consists in specific conditions for the process of wet grinding precipitated calcium carbonate.

Namely, the specific wet grinding conditions according to the present invention are such that the ratio $R_2$ of the primary particle size $D_1$ to $D_2$ calculated by the above-mentioned formula (1) from the specific surface areas of the precipitated calcium carbonate before and after wet grinding is:

$$R_2 = D_1/D_2, \quad 1 < R_2 \leq 10$$

Where: $D_2$ = The diameter (μm) of primary particles of wet-ground precipitated calcium carbonate calculated from the specific surface area $S_2$ measured by the BET method (FIGS. 5 and 6).

Figure 5:
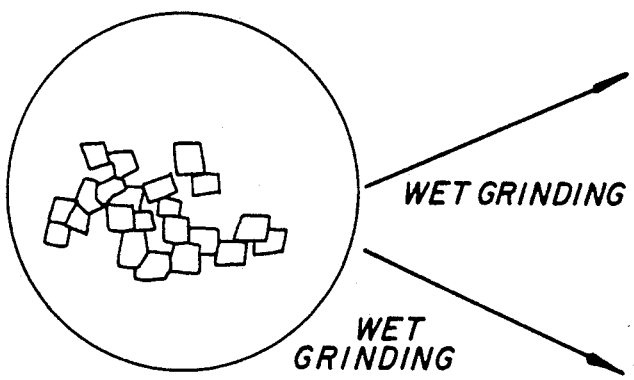
FIGS. 5 and 6 show precipitated calcium carbonate of the present invention obtained by wet grinding.
Figure 6:
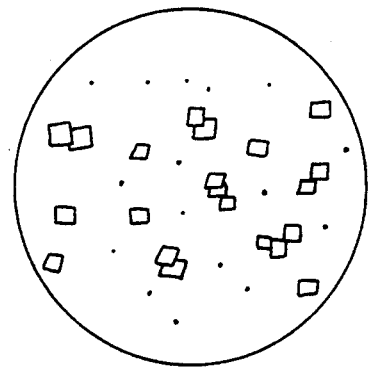
Figure 7:
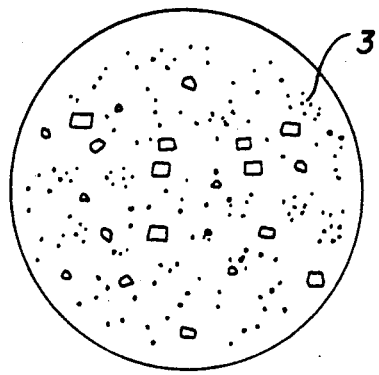
FIG. 7 shows precipitated calcium carbonate wherein $R_2 > 10$.

In contrast thereto, when the grinding conditions are so set that $R_2$ is in excess of 10, excessive grinding may result in marked attrition of the surface of the primary particles and in an unfavorable phenomenon of formation of an increased amount of unnecessary ultrafine particles (3) (FIGS. 5 and 7).

Hence, calcium carbonate not containing a large amount of unnecessary ultrafine particles can be obtained by means of wet grinding under the aforesaid specific conditions.

Calcium carbonate prepared by these methods, that is, calcium carbonate prepared to have combined therein the aforesaid three features is qualified to be a highgrade calcium carbonate good for manufacture of highly functional polyester film et cetera and will also satisfy the properties sought after by polyester manufacturers, manufacturers of electric machines and appliances et al.

Precipitated calcium carbonate used as material wet-ground for manufacture of such a highgrade calcium carbonate is a synthetic calcium carbonate prepared by chemical processes such as the so-called carbon dioxide process in which milk of lime made through reaction of quick lime obtained by calcining limestone with water, and then passing carbon dioxide generated from calcination of limestone through the milk of lime, the limesoda process in which sodium carbonate is caused to react with milk of lime and the soda process in which sodium carbonate is caused to react with calcium chloride, and there is no particular limitation with respect to such manufacturing process, but it is apparent that the carbonation method or manufacturing method is required to be such that the precipitated calcium carbonate satisfies the aforesaid two requirements of $0.1 \leq D_1$, $R_1 \leq 7$.

For manufacture of such high grade calcium carbonate with precipitated calcium carbonate as wet grinding material by the carbon dioxide process, the following methods may be proposed but this naturally means no limitation.

(1) A method of preparing an aqueous suspension of precipitated calcium carbonate in extremely fine powder form with a particle size of less than 0.1 $\mu$m in a usual manner, converting it into an equivalent aqueous dispersion through proper pH control, passing carbon dioxide through or dripping primarily carbonated milk of lime (milk of lime partially carbonated in advance) into the aqueous dispersion of precipitated calcium carbonate in extremely fine powder form so that pH of the system is controlled to be within the specified range, and thus causing the particles to grow with the calcium carbonate in extremely fine powder form as nuclei (Japanese Patent Examined Publication No. 43331/83), or like method.

(2) The method described above under (1) with the primarily carbonated milk of lime substituted with milk of lime, or like method.

(3) A method of spraying milk of lime in an atmosphere of carbon dioxide under specific conditions for carbonation reaction to proceed, an aqueous suspension of calcium carbonate in extremely fine powder form with a particle size of less than 1 $\mu$m and, after adding milk of lime to the aqueous suspension of calcium carbonate in extremely fine powder form at a fixed rate, the resulting mixture is resprayed into the atmosphere of carbon dioxide and this procedure is repeated for particles to grow progressively with calcium carbonate in extremely fine powder form as nuclei (Japanese Patent Examined Publication No. 28397/79), or like method.

(4) A method of manufacturing precipitated calcium carbonate by passing carbon dioxide through milk of lime, wherein a strontium or barium salt is used in the carbonation process (Japanese Patne Non-examined Publication No. 69425/84).

(5) A method of stirring an aqueous suspension of precipitated calcium carbonate prepared in a usual manner and having its pH controlled within a specific range to thereby improve the degree of dispersion of the precipitated calcium carbonate.

According to the present invention, the primary particle size of precipitated calcium carbonate calculated from the specific surface area measured by the BET method is meant the primary particle size of precipitated calcium carbonate not yet wet-ground regardless of the suspending or dispersing medium such as water or glycol, that is, of the precipitated calcium carbonate in powder form obtained by drying an aqueous suspension of precipitated calcium carbonate made by carbonation by, for instance, the carbon dioxide process or the solution processes such as the lime soda process and soda process. The 50% weight average particle size $d_1$ measured by the Light Transmission Centrifugal Precipitation-Type Particle Size Distribution Measuring Device was determined as follow.

Measuring Device: SA-CP-2 (manufactured by Shimazu Seisakusho Ltd.)
Measuring method:
Solvent: 0.2% aqueous solution of sodium hexamethalate
Preliminary dispersion: Shaking for 10 minutes by KM Shaker Model V-5 (manufactured by Iwaki Co., Ltd.)
Speed of particle size measuring device: 1,200 rpm.
Height of liquid level: 1 cm above bottom of the cell
Measuring temperature: 25° C.
Measuring method: Calculation to be made by the following formula

| Result of particle size distribution measurement (Example) | |
|---|---|
| Particle size ($\mu$m) | Cumulative part. size distrib. (%) |
| –6 | 0.6 |
| 6–5 | 1.0 |
| 5–4 | 1.9 |
| 4–3 | 2.9 |
| 3–2 | 7.3 |
| 2–1 | 22.1 |
| 1–0.8 | 38.9 |
| 0.8–0.6 | 62.4 |
| 0.6–0.5 | 73.7 |
| 0.5–0.4 | 84.5 |
| 0.4–0.3 | 100.0 |
| 0.3–0.2 | — |
| 0.2– | — |

$0.6 \mu m + [(62.4\% - 50\%)/(62.4\% - 38.9\%)] \times (0.8 \mu m - 0.6 \mu m) = 0.706 \mu m$ Hence, the 50% weight average particle size for the above particle size distribution is assumed to be 0.706 $\mu$m.

The present invention is described below in greater detail and more concretely showing examples and control examples but, needless to say, these mean no limitation of the invention.

The grades of calcium carbonate used in examples and control examples are as described below.

Calcium Carbonate A

Furnace exhaust gas containing 25% of $CO_2$ (hereinafter called "the $CO_2$ gas") was passed through 7.2 m$^3$ of milk of lime, 30° C. and 1.080 in specific gravity at a rate of 2 m$^3$/minute for carbonation to proceed and it was terminated when the system's pH reached 6.8, and thus an aqueous dispersion (solid concentration 16.8%) of the precipitated calcium carbonate A was obtained. The specific surface area measured by the BET method and the particle size distribution of thereof are shown in Table 1.

Calcium Carbonate B

A commercially available grade of ground calcium carbonate (Super #1700; manufactured by Maruo Calcium Co., Ltd.) was taken as the calcium carbonate B. Its specific surface area was 1.68 m$^2$/g (when measured by the so-called constant pressure ventilating measuring method) and 3.56 m$^2$/g (BET method).

Calcium Carbonate C

The $CO_2$ gas was passed through 7.2 m$^3$ of milk of lime, 15° C. and 1.070 in specific gravity at a rate of 20 m$^3$/minute until completion of carbonation. Then, the system's temperature was adjusted to 50±5° C. and its pH to 10±0.5 by the use of the $CO_2$ gas and milk of lime and after subsequent stirring for 24 hours a viscous aqueous dispersion of the precipitated calcium carbonate C was obtained. The specific surface area measured by the BET method and the particle size distribution thereof are shown in Table 1.

Calcium Carbonate D

To 4 $m^3$ of an aqueous dispersion of the precipitated calcium carbonate C with its temperature adjusted to 50° C.±5° C., milk of lime with 1.070 in specific gravity was dripped at a rate of 0.6 $m^3$/hour with simultaneous passing of the $CO_2$ gas through the system for carbonation to proceed with the system's pH kept at 10±0.5 under stirring. Dripping of milk of lime was terminated when the total amount added reached 32 $m^3$, the $CO_2$ gas was passed through the system until its pH reached 7.0 and thus an aqueous dispersion of the precipitated calcium carbonate D was obtained. The specific surface area measured by the BET method and the particle size distribution thereof are shown in Table 1.

Calcium Carbonate E

Milk of lime with the specific gravity of 1.070 was dripped into 3 $m^3$ of an aqueous dispersion of precipitated calcium carbonate (solid concentration 14.9%), whose temperature was adjusted to 50° C.±5° C., at a rate of 0.6 $m^3$/hour with simultaneous passing of the $CO_2$ gas therethrough for carbonation to proceed under stirring with the system's pH kept 10±0.5. When the total amount of the milk of lime added reached 6.0 $m^3$, its dripping was terminated with the $CO_2$ gas passage continued until the system's pH reached 7.0, and thus an aqueous dispersion of the precipitated calcium carbonate E was obtained. The specific surface area measured by the BET method and the particle size distribution thereof are shown in Table 1.

Calcium Carbonate F

To 43 $m^3$ of milk of lime with the specific gravity of 1.080, 12 kg of strontium carbonate were added the $CO_2$ gas was passed therethrough at a rate of 5 $m^3$/minute under stirring for carbonation to proceed and the reaction was terminated when the system's pH reached 8.0. Then, with the system's temperature kept at 60° C.±5° C. stirring was continued for the alkali residues to be eluated and by partial use of the $CO_2$ gas the system's pH was adjusted to 10±1 and after stirring for 24 hours it was lowered to 7.0 using the $CO_2$ gas, and thus an aqueous dispersion of the precipitated calcium carbonate F was obtained. The specific surface area measured by the BET method and the particle size distribution of thereof are shown in Table 1.

Surface treating agent 1:
A copolymer of 50 mol % of acrylic acid with 50 mol % of polyethylene glycol monomethacrylate.

Surface treating agent 2:
Ammonium salt of a copolymer of 80 mol % of acrylic acid and 20 mol % of propylacrylate with 85% of the total carboxyl groups of the copolymer neutralized with ammonium.

Surface treating agent 3:
A copolymer of 30 mol % of acrylic acid and 70 mol % of hydroxyethylacrylate.

Surface treating agent 4:
Sodium salt of the surface treating agent 3 with 50% of the total carboxyl groups of the copolymer neutralized with sodium.

Surface treating agent 5:
Amine salt of a copolymer of 70 mol % of acrylic acid, 10 mol % of maleic acid and 20 mol % of methoxyethylacrylate with 40% of the total carboxyl group of the copolymer neutralized with amine.

Surface treating agent 6:
Sodium salt of a copolymer of 70 mol % of acrylic acid, 10 mol % of itaconic acid and 20% of cyclohexylacrylate with 40% of the total carboxyl groups of the copolymer neutralized with sodium.

Surface treating agent 7:
Sodium salt of a copolymer of 90 mol % of acrylic acid and 10 mol % of methoxypolyethylene glycol polypropylene glycol monomethacrylate with 100% of the carboxyl groups of the copolymer neutralized with sodium.

Surface treating agent 8:
Ammonium salt of a copolymer of 50 mol % of acrylic acid with 40 mol % of the polyethylene glycol and 10 mol % of

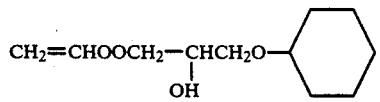

with 50% of the total carboxyl groups of the copolymer neutralized with ammonium.

Surface treating agent 9:
Sodium salt of an acrylic acid polymer with 100% of the carboxyl groups contained therein neutralized with sodium.

Surface treating agent 10:
Sodium stearate,

Surface treating agent 11:
Monomer of ethylene glycol monomethacrylate.

TABLE 1

| | Calcium carbonate | | | | |
|---|---|---|---|---|---|
| | A | C | D | E | F |
| Spec. surf. area by BET method $S_1$ ($cm^2/g$) | 55,000 | 340,000 | 28,500 | 14,200 | 48,600 |
| $D_1$ calculated from $S_1$ (μm) | 0.40 | 0.065 | 0.78 | 1.56 | 0.46 |
| Cumulative part. size distri. (%) by SA-CP-2 | | | | | |
| −6 (μm) | 7.7 | 0 | 0 | 1.8 | 0.3 |
| 6–5 | 14.8 | 0 | 1.1 | 4.7 | 0.9 |
| 5–4 | 26.8 | 0.9 | 2.2 | 7.3 | 1.5 |
| 4–3 | 54.9 | 2.0 | 4.1 | 13.3 | 2.2 |
| 3–2 | 90.9 | 4.1 | 8.7 | 31.8 | 4.1 |
| 2–1 | 100.0 | 9.9 | 40.5 | 75.3 | 14.3 |
| 1–0.8 | | 13.6 | 59.6 | 83.7 | 22.2 |
| 0.8–0.6 | | 22.3 | 76.2 | | 37.9 |
| 0.6–0.5 | | 31.2 | 83.9 | | 49.2 |
| 0.5–0.4 | | 47.6 | 100.0 | | 64.5 |
| 0.4–0.3 | | 72.2 | | | 79.9 |
| 0.3–0.2 | | 92.6 | | | 89.3 |
| 0.2– | | 100.0 | | | 100.0 |
| 50% wt. avg. of part. size dist. $d_1$ (μm) | 3.17 | 0.39 | 0.90 | 1.58 | 0.59 |
| $R_1$ (= $d_1/D_1$) | 7.93 | 6.0 | 1.15 | 1.01 | 1.28 |

EXAMPLE 1

A press cake (solid content 60%) obtained by dehydrating the calcium carbonate A (an aqueous dispersion thereof with a solid concentration of 16.8%) by the use of a filter press was thrown into an externally heated treating vessel, the surface treating agent 1 was added to the aforesaid press cake in an amount of 1 weight % (as 100% pure) on the solid content of calcium carbonate therein and after subsequent intensive stirring at 70° C. a concentrated slurry of surface-treated calcium carbonate with a solid concentration of 60% was obtained with the calcium carbonate A as material. The concentrated slurry of surface-treated calcium carbonate was pulverized after drying by a spray dryer, and thus surface-treated powder of the calcium carbonate A was obtained.

50 kg of this surface-treated powder of the calcium carbonate A was poured into 50 kg of ethylene glycol (Fiber Grade A of Mitsubishi Petrochemical Co., Ltd.) to prepare an ethylene glycol slurry as material to be wet-ground, this slurry was passed through a wet grinder (Dynomill Pilot-type of WAB Ltd., media: glass beads 0.6–0.9 mm $\phi$, media charging rate 80%, running speed 1,500 rpm.) twice for wet grinding and an ethylene glycol dispersion of the calcium carbonate A was thus prepared.

EXAMPLE 2

An ethylene glycol dispersion of the calcium carbonate A was prepared in the same manner as described above in Example 1 except that the surface treating agent 2 was used instead of the surface treating agent 1.

EXAMPLE 3

An ethylene glycol dispersion of the calcium carbonate A was prepared in the same manner described above in Example 1 except that the surface treating agent 3 was used instead of the surface treating agent 1 and that the amount added of the surface treating agent was changed to 2 weight %.

EXAMPLE 4

An ethylene glycol dispersion of the calcium carbonate A was prepared in the same manner as described in Example 3 except that the surface treating agent 4 was used instead of the surface treating agent 3.

EXAMPLE 5

An ethylene glycol dispersion of the calcium carbonate A was prepared in the same manner as described in Example 1 except that the surface treating agent 3 was used instead of the surface treating agent 1 and that the surface treating temperature was changed to 40° C.

EXAMPLE 6

10 kg of the pulverized calcium carbonate B was charged into a super mixer (SMV-20 of Kawaguchi Seisakusho Ltd.) and with the powder being fluidized by stirring with the stirring blades inside the mixer running at a speed of 1,200 rpm, the surface treating agent 5 was added to the calcium carbonate B in an amount of 0.8 weight % (as 100% pure) and stirring was continued for 15 minutes at a treating temperature of 80° C. and could thus obtain surface-treated calcium carbonate B.

10 kg of this surface-treated powder of the calcium carbonate B was poured into 10 kg of ethylene glycol under stirring and an ethylene glycol dispersion of the calcium carbonate B was obtained in otherwise the same manner as described above in Example 1.

EXAMPLE 7

An ethylene glycol dispersion of the calcium carbonate B was prepared in the same manner as described in Example 6 except that the surface treating agent 6 was used instead of the surface treating agent 5.

EXAMPLE 8

70 kg of the calcium carbonate B was suspended in 30 liters of water, to this aqueous suspension the surface treating agent 7 was added in an amount of 1.5 weight % (as 100% pure) on the solid content of calcium carbonate and by subsequent intensive stirring at a surface treating temperature of 50° C. a concentrated slurry of surface-treated calcium carbonate with a solid concentration of 70% was obtained with the calcium carbonate B as material. Then this concentrated slurry of the surface-treated calcium carbonate was passed through a wet grinder (same as used in Example 1) at a rate of 1 liter/minute for wet grinding. The concentrated slurry of the surface-treated calcium carbonate was pulverized after drying by the spray dryer and a surface-treated powder of the calcium carbonate B was thus obtained.

50 kg of this surface-treated calcium carbonate B was poured into 50 kg of ethylene glycol, and an ethylene glycol dispersion of the calcium carbonate B was obtained in otherwise the same manner as described above in Example 1.

CONTROL EXAMPLE 1

An ethylene glycol dispersion of the calcium carbonate A was prepared in the same manner as in Example 1 except that the surface treating agent 9 was used instead of the surface treating agent 1.

CONTROL EXAMPLE 2

30 kg of the calcium carbonate B was suspended in 70 liters of water, a warm dilute solution of the surface treating agent 10 was added to this aqueous suspension in an amount of 3 weight % (as 100% pure) on the solid content of calcium carbonate and after intensive stirring, it was dehydrated by the use of a filter press, and the resulting press cake (solid concentration 68%) was dried by a paddle dryer and pulverized by the use of a dry pulverizer and a surface-treated powder of the calcium carbonate B was thus obtained.

20 kg of this surface-treated powder of the calcium carbonate B was poured into 30 kg of ethylene glycol and stirred, and an ethylene glycol dispersion of the calcium carbonate B was obtained in otherwise the same manner as described in Example 1.

CONTROL EXAMPLE 3

An ethylene glycol dispersion of the calcium carbonate B was prepared in the same manner as described above in Example 1 except that 50 kg powder of non-surface-treated calcium carbonate B was poured into 50 kg of ethylene glycol and subsequently stirred.

CONTROL EXAMPLE 4

An ethylene glycol dispersion of the calcium carbonate A was prepared in the same manner as described above in Example 1 except that a mixture of the surface treating agent 9 and the surface treating agent 11 (an equimol mixture with no addition of polymerization initiator) was used instead of the surface treating agent 1.

EXAMPLE 9

Figure 9:
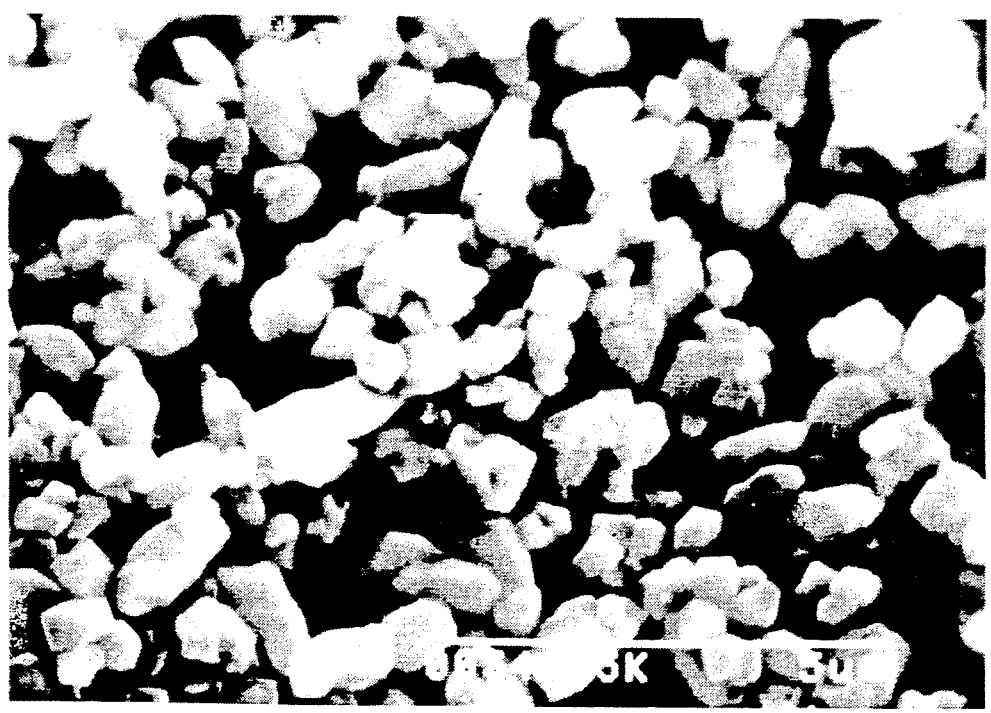
Figure 10:
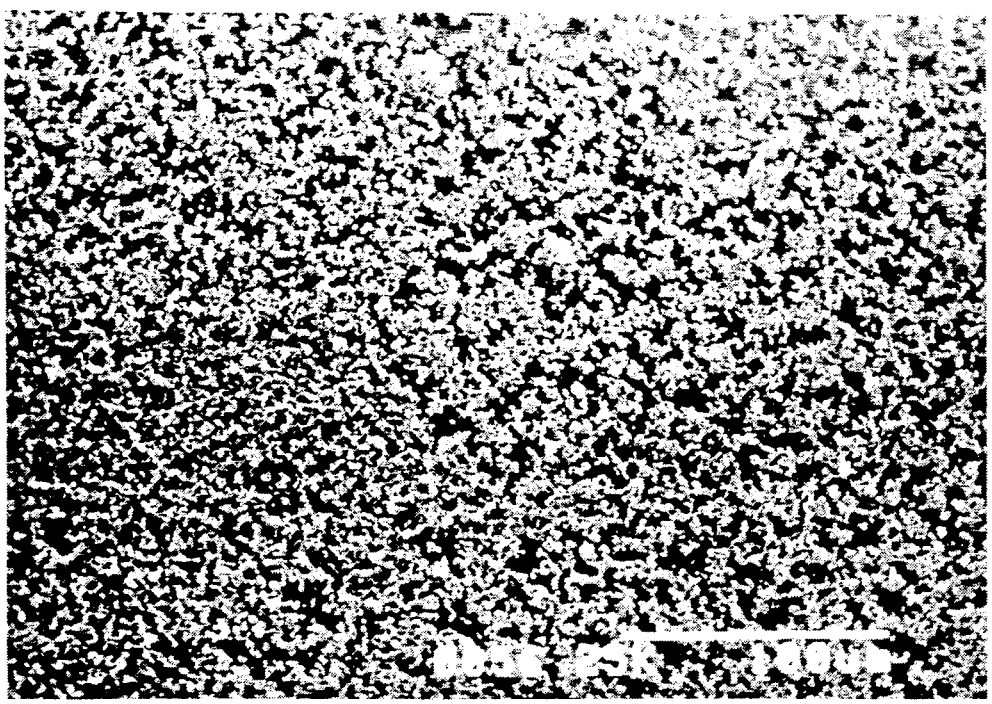

An aqueous dispersion of the precipitated calcium carbonate D (solid concentration 14.9%) was dehydrated by the use of a filter press, the resulting press cake (solid concentration 60%) was thrown into an externally heated treating vessel and to this press cake the surface treating agent 1 was added in an amount of 1 weight % (as 100% pure) on the solid content of calcium carbonate and by subsequent intensive stirring at a surface treating temperature of 70° C. a concentrated slurry of surface-treated calcium carbonate with the solid concentration of 60% was prepared with the calcium carbonate D as material. The concentrated slurry of surface-treated calcium carbonate was pulverized after drying by a spray dryer, and thus a surface-treated powder of the precipitated calcium carbonate D was obtained. 50 kg of this surface-treated powder of the precipitated calcium carbonate D was poured into 50 kg of ethylene glycol (Fiber Grade A of Mitsubishi Petrochemical Co., Ltd.) under stirring to prepare an ethylene glycol slurry for wet grinding, this slurry was passed though the wet grinder (Dynomill Pilot-type of WAB Ltd., media: glass beads 0.5–0.9 mm $\phi$, media charging rate 80%, running speed 1,500 rpm., hereinafter the same) at a rate of 120 ml/minute for wet grinding, and an ethylene glycol dispersion of the precipitated calcium carbonate D was thus prepared. The result of measurement taken of the particle size distribution by the use of SA-CP-2 and the 50% weight average diameter $d_2$, $S_2$, $D_2$ and $R_2$ calculated from the measured particle size distribution are shown in Table 3. An electron microscopic picture taken of the aforesaid dispersion is shown in FIG. 9 ($\times 10,000$) and in FIG. 10 ($\times 300$). As seen from the Table 3, FIG. 9 and FIG. 10, the ethylene glycol dispersion of the calcium carbonate D is relatively uniform in particle size, its particle size unnecessarily fine particles was small and it was confirmed that there was no presence of coarse particle 2–3 $\mu$m in size.

EXAMPLE 10

Figure 11:
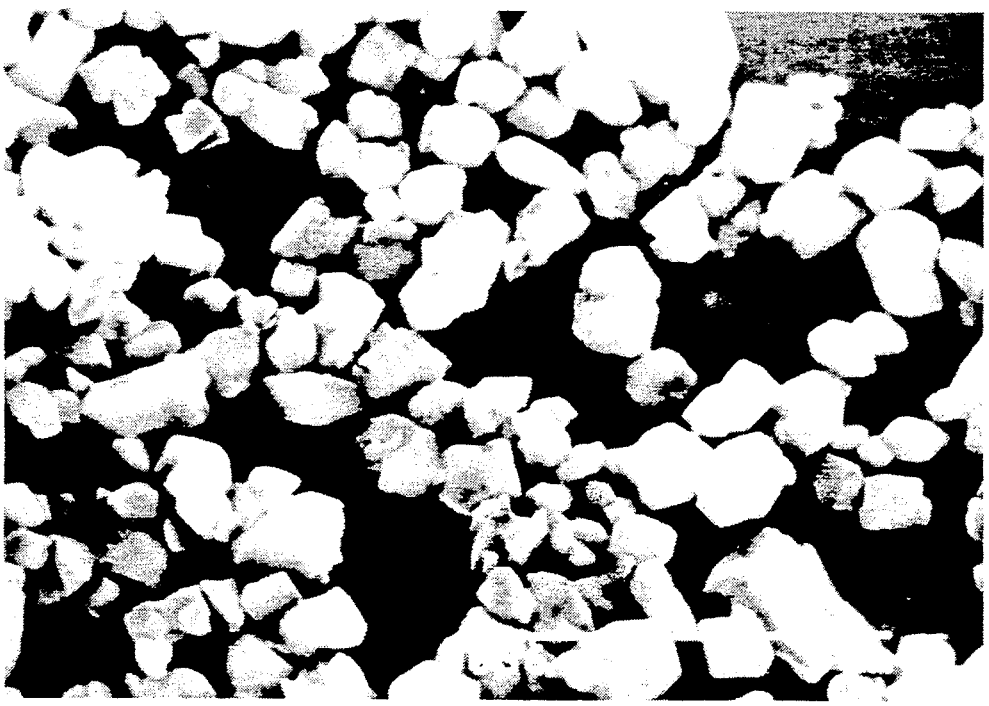

An ethylene glycol dispersion of the precipitated calcium carbonate E was prepared in the same manner as described above under Example 9 except that the precipitated calcium carboante E was used instead of the precipitated calcium carbonate D and that the surface treating agent 3 was used instead of the surface treating agent 1. The result of measurement of particle size distribution of this dispersion by the use of SA-CP-2, namely $d_2$, $S_2$, $D_2$ and $R_2$, is shown in Table 3. An electron microscopic picture of this ethylene glycol dispersion is shown in FIG. 11 ($\times 10,000$).

EXAMPLE 11

An ethylene glycol dispersion of the precipitated calcium carbonate F was prepared in the same manner as described above under Example 9 except that the precipitated calcium carbonate F was used instead of the precipitated calcium carbonate D, that the surface treating agent 6 was used instead of the surface treating agent 1 and that the wet grinder passing rate of the ethylene glycol slurry was increased from 120 ml/minute to 250 ml/minute. The result of measurement of particle size distribution of this dispersion by the use of SA-CP-2, namely $d_2$, $S_2$, $D_2$ and $R_2$, is shown in Table 3.

EXAMPLE 12

An ethylene glycol dispersion of the calcium carbonate of the precipitated calcium carbonate D was prepared in the same manner as described above in Example 9 except that the surface treating agent 8 was used instead of the surface treating agent 1. The result of measurement of particle size distribution of this dispersion by the use of SA-CP-2, namely $d_2$, $S_2$, $D_2$ and $R_2$, is shown in Table 3.

EXAMPLE 13

Figure 12:

An ethylene glycol dispersion of the precipitated calcium carbonate E was prepared in the same manner as described above under Example 10 except that in the wet grinding process the ethylene glycol slurry as wet grinding material was passed through the wet grinder three times at a rate of 60 ml/minute. The result of measurement of particle size distribution of this dispersion by the use of SA-CP-2, namely $d_2$, $S_2$, $D_2$ and $R_2$, is shown in Table 3. Also an electron microscopic picture ($\times 10,000$) of the dispersion is shown in FIG. 12.

EXAMPLE 14

Figure 13:
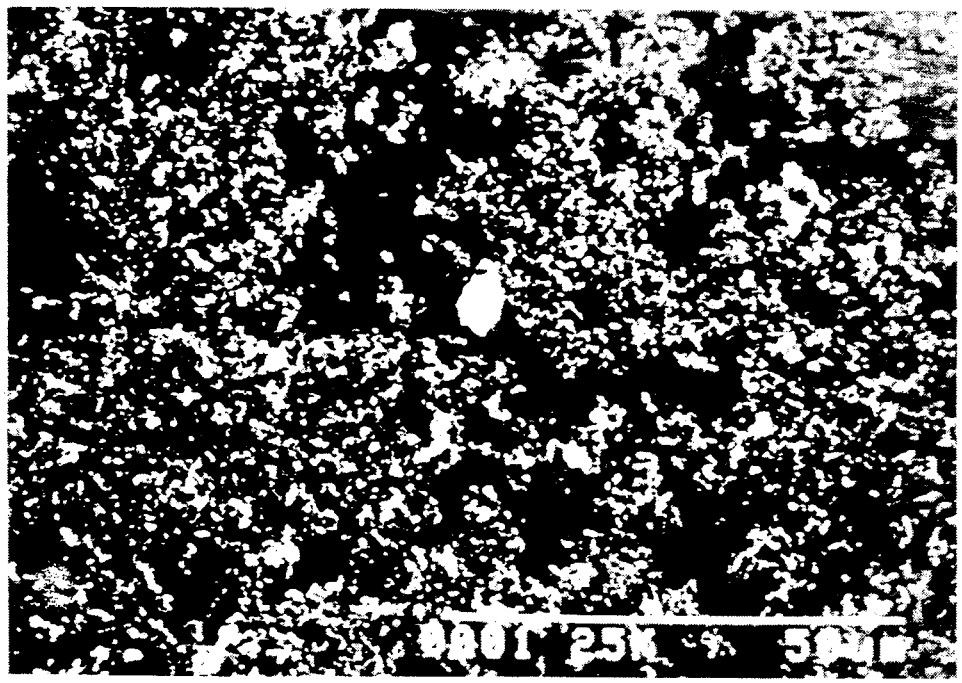

An aqueous dispersion of the precipitated calcium carbonate C (solid concentration 14.9%) was dehydrated by the use of a filter press, the resulting press cake (solid concentration 57%) was thrown into an externally heated treated vessel and to this press cake the surface treating agent 1 was added in an amount of 2 weight % (as 100% pure) on solid content of the calcium carbonate and by subsequent intensive stirring at a surface treating temperature of 70° C. a concentrated slurry of surface-treated precipitated calcium carbonate 57% in solid concentration was prepared with the calcium carbonate C as material. The concentrated slurry of the surface-treated calcium carbonate was pulverized after drying by a spray dryer, and thus a surface-treated powder of the precipitated calcium carbonate C was obtained. 30 kg of the surface-treated powder of the precipitated calcium carbonate C was poured into 70 kg of ethylene glycol under stirring to prepare an ethylene glycol slurry as wet grinding material, this slurry was passed through a wet-grinder twice at a rate of 60 ml/minute for wet grinding, and an ethylene glycol dispersion of the precipitated calcium carbonate C was prepared. The result of measurement of particle size distribution of this dispersion by the use of SA-CP-2, namely $d_2$, $S_2$, $D_2$ and $R_2$, is shown in Table 3. Also an electron microscopic picture of the dispersion ($\times 10,000$) is shown in FIG. 13.

CONTROL EXAMPLE 5

An aqueous dispersion of the calcium carbonate A (solid concentration 16.8%) was dehydrated by the use of a filter press, the resulting press cake was pulverized afte drying by a paddle dryer and 50 kg of dry powder of the precipitated calcium A was obtained. 50 kg of this precipitated calcium carbonate A was poured into 50 kg of ethylene glycol (Fiber Grade A of Mitsubishi Petrochemical Co., Ltd.) to prepare an ethylene glycol slurry for wet grinding. This slurry was passed through a wet-grinder twice at a rate of 60 ml/minute, and an ethylene glycol dispersion of the precipitated calcium carbonate A was prepared. The result of measurement of particle size distribution of this dispersion by the use of SA-CP-2, namely $d_2$, $S_2$, $D_2$ and $R_2$, is shown in Table 3. An electron microscopic picture ($\times 5,000$) of the dispersion is shown in FIG. 15, another electron microscopic picture (×2,000) is shown in FIG. 16, and an electron microscopic picture (×10,000) of the precipitated calcium carbonate A as wet grinding material is shown in FIG. 14 respectively.

Figure 14:
Figure 15:
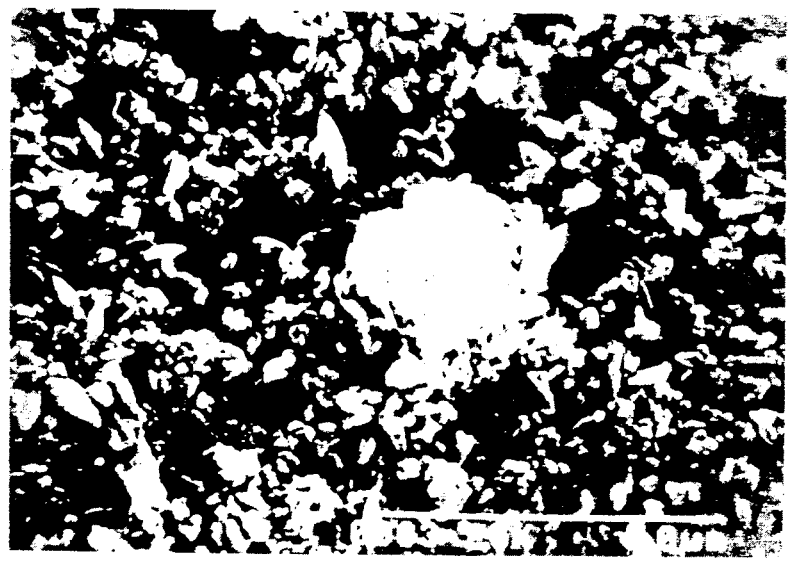
Figure 16:
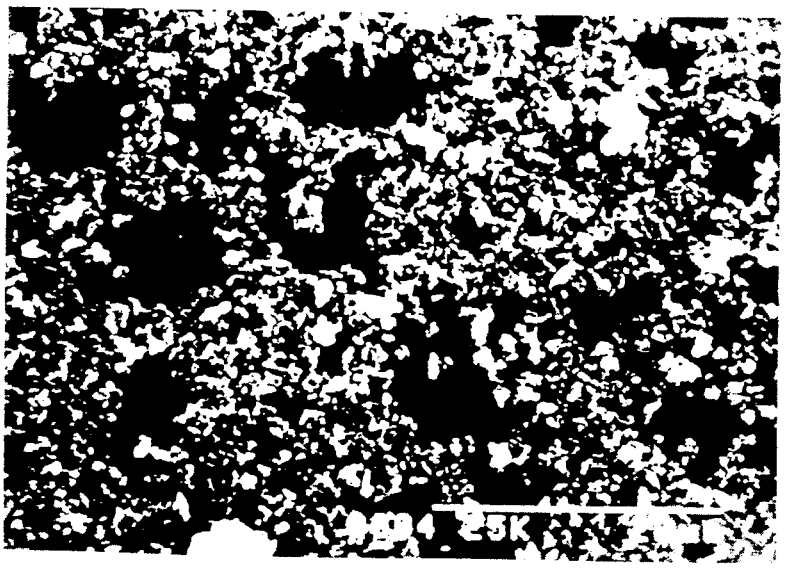

From the results shown in Table 3 and FIGS. 14, 15 and 16, it could be confirmed that the ethylene glycol dispersion of the precipitated calcium carbonate A, which was obtained by wet grinding the precipitated calcium carbonate A with $R_1>7$ (See FIG. 1.), which means that cohesiveness between primary particles is extremely high and larger secondary particles are likely to be formed, had mixed therein coarse secondary particles approximately 5 μm in size, despite the fact that in the wet grinding process for the ethylene glycol system 4 times as intensive grinding conditions as in Example 9 is adopted.

APPLICATION EXAMPLE 1

Long-term Stability of Ethylene Glycol Dispersion 1 liter each of the ethylene glycol dispersions of the calcium carbonate prepared in Examples 1-14 and Control examples 1-5 was taken into a measuring cylinder and after 60 days of still-standing the condition of separation in the ethylene glycol dispersion of calcium carbonate between calcium carbonate and ethylene glycol in the measuring cylinder as well as the condition of calcium carbonate precipitated to deposit on the bottom thereof was observed. The result is shown in Table 2. The criteria for evaluation are as follows:

O: Separation between calcium carbonate and ethylene glycol is scarcely noticeable and the calcium carbonate deposited on the bottom of the measuring cylinder is soft and easily redispersible.

Δ: Separation between calcium carbonate and ethylene glycol is noticeable but the calcium carbonate deposited on the bottom of the measuring cylinder is relatively soft and relatively easily redispersible.

×: Marked separation between calcium carbonate and ethylene glycol is noticeable and the calcium carbonate deposited on the bottom of the measuring cylinder is difficult to redisperse.

APPLICATION EXAMPLE 2

Affinity Between Calcium Carbonate Particles and PET Resin 100 weight parts of dimethyl phthalate and 70 weight parts of ethylene glycol were subjected to ester exchange reaction in a usual manner with 0.035 parts of tetrahydrate of manganese acetate as catalyst, and to this each of the ethylene glycol dispersions of calcium carbonate prepared in Examples 1-14 and Control examples 1-5 was added under stirring until the calcium carbonate concentration in the polymer reached 5,000 ppm. Then, polycondensation was carried out in a usual manner in vacuum at a high temperature and polyethylene terephthalate having the intrinsic viscosity of 0.630 was thus obtained. Each of these polymers was molten at 290° C. and then extruded, and after stretching 3.5 times longitudinally at 90° C. and 3.5 times laterally at 130° C., heat treatment was carried out at 220° C. and thus a film 15 μm which was obtained. Each film had its surface layer of polymer removed by etching to reveal calcium carbonate and the affinity between calcium carbonate and polyester was evaluated by measuring the diameter of the void (Dv) and the diameter of calcium carbonate particle (Dc) through a scanning type electron microscope (×20,000). The results are shown in Table 2. The evaluation criteria are as follows:

: $1 \leq Dv/Dc < 1.2$ Voids are absent or extremely
⊚ small, if any.
O: $1.2 \leq Dv/Dc < 111.5$
Δ: $1.5 \leq Dv/Dc < 3.0$
×: $3.0 \leq Dv/Dc < 4.0$

APPLICATION EXAMPLE 3

Filtrability of Ethylene Glycol Dispersion 400 ml each of 10 weight % dilute solid solutions of the ethylene glycol dispersions prepared in the Examples 9-14 and Control example 5 was prepared by further dilution with ethylene glycol. Immediately after preparation and 24 hours thereafter 200 ml of each 10 weight % dilute solid solution was filtrated under pressure of 2 kg/cm² through a 8 μm-thick membrane filter (manufactured by Milipore Inc.) and its passing rate was measured. The results are shown in Table 3.

APPLICATION EXAMPLE 4

Dispersibility of Calcium Carbonate in PET Resin

Of the polymers prepared in Application example 2, each of those prepared by the use of the ethylene glycol dispersions of calcium carbonate obtained in Examples 9-14 and Control example 5 was put between two sheets of cover glass, melt-pressed at 280° C. and after subsequent quenching observation was made through a microscope, and the dispersibility of particles in the polymer was evaluated with agglomeration of a plurality of primary particles regarded as formation of coarse particles. As to the dispersibility of particles, the number of coarse particles in excess of 4 times the average primary particle size present in 1 mm² was counted and evaluation was made according to the following criteria. The results are shown in Table 3. By the way, 50% weight average diameter $d_2$ of particle size distribution was taken as average primary particle size.

⊚: When the number of coarse particles is not more than 10 pieces/mm²

O: When the number of coarse particles is not less than 11 pieces/mm² and not more than 30 pieces/mm²

Δ: When the number of coarse particles is not less than 31 pieces/mm² and not more than 50 pieces/mm²

×: When the number of coarse particles is not less than 51 pieces/mm²

TABLE 2

| Example | Result of Application example 1 | Result of Application example 2 |
|---|---|---|
| 1 | O | ⊚ |
| 2 | O | ⊚ |
| 3 | O | ⊚ |
| 4 | O | ⊚ |
| 5 | O | ⊚ |
| 6 | O | ⊚ |
| 7 | O | ⊚ |
| 8 | O | O |
| 9 | O | ⊚ |
| 10 | O | ⊚ |
| 11 | O | ⊚ |
| 12 | O | ⊚ |
| 13 | O | ⊚ |
| 14 | O | O |
| Control example | | |
| 1 | O | Δ |
| 2 | Δ | Δ |
| 3 | × | × |

TABLE 2-continued

|   | Result of Application example 1 | Result of Application example 2 |
|---|---|---|
| 4 | ○ | △ |
| 5 | × | × |

TABLE 3

|  | Example | | | | | | Control example |
|---|---|---|---|---|---|---|---|
|  | 9 | 10 | 11 | 12 | 13 | 14 | 5 |
| Spec. sur. area $S_2$ by BET method (cm²/g) | 76700 | 32900 | 131600 | 75300 | 173000 | 421000 | 118000 |
| $D_2$ calculated from $S_2$ (μm) | 0.29 | 0.68 | 0.17 | 0.30 | 0.13 | 0.053 | 0.18 |
| Part. size distribution (%) | | | | | | | |
| −6 (μm) | 0 | 0.8 | 0 | 0 | 1.5 | 1.1 | 0 |
| 6–5 | 0.5 | 1.8 | 0 | 0.5 | 2.4 | 1.3 | 0.2 |
| 5–4 | 1.1 | 4.1 | 0.2 | 1.2 | 5.3 | 1.5 | 0.7 |
| 4–3 | 2.1 | 7.5 | 0.9 | 2.4 | 8.1 | 1.7 | 1.4 |
| 3–2 | 6.8 | 16.9 | 1.1 | 6.9 | 17.3 | 3.0 | 3.5 |
| 2–1 | 21.0 | 57.6 | 6.5 | 22.1 | 40.5 | 6.8 | 12.0 |
| 1–0.8 | 39.0 | 75.2 | 10.4 | 41.3 | 63.3 | 8.1 | 18.7 |
| 0.8–0.6 | 62.7 | 86.7 | 21.1 | 64.0 | 71.4 | 12.3 | 30.8 |
| 0.6–0.5 | 74.3 | 100.0 | 30.7 | 75.0 | 78.5 | 14.6 | 41.4 |
| 0.5–0.4 | 86.8 | — | 46.9 | 86.5 | 82.8 | 21.3 | 56.4 |
| 0.4–0.3 | 100.0 | — | 65.4 | 100.0 | 89.8 | 60.7 | 75.5 |
| 0.3–0.2 | — | — | 89.2 | — | 100.0 | 72.9 | 100.0 |
| 0.2– | — | — | 100.0 | — | — | 100.0 | — |
| 50% avg. dia. of particle size distribution $d_2$ (μm) | 0.707 | 1.187 | 0.383 | 0.723 | 0.917 | 0.327 | 0.433 |
| $R_2(D_1/D_2)$ | 2.69 | 2.29 | 2.71 | 2.60 | 12.0 | 1.22 | 2.22 |
| Result of App. Exam. 3 | | | | | | | |
| passing rate immediately after preparation (ml) | 200 | 200 | 200 | 200 | 200 | 180 | 140 |
| passing rate 24 hrs. after preparation (ml) | 200 | 200 | 200 | 200 | 165 | 150 | 100 |
| Result of Applica. Exam. 4 | ⊙ | ⊙ | ⊙ | ⊙ | X | X | X |

As mentioned above, the glycol dispersion of the calcium carbonate according to the present invention features a good dispersion stability of calcium carbonate in glycol and also good affinity with polyester in polyester products manufactured with this as a material, thus contributing to improvement of polyester's surface property.

Furthermore, since the glycol dispersion of calcium carbonate prepared using a specific grade of calcium carbonate under specific conditions has a particularly high dispersibility in glycol as well as uniformity of particle size in addition to the aforesaid features, hence it is well suited for use in the manufacture of high quality and highly functional polyester products.

What is claimed is:

1. A glycol dispersion consisting of calcium carbonate and glycol prepared by wet grinding a glycol slurry composed of glycol and a material in powder form to be wet-ground, wherein said material to be wet-ground is calcium carbonate surface-treated with at least one surface treating agent selected from the group consisting of a copolymer (A) of at least one of an α,β-monoethylenically unsaturated carboxylic acid and its salt with an α, β-monoethylenically unsaturated carboxylic acid ester, and a salt (B) of a copolymer of an α, β-monoethylenically unsaturated carboxylic acid with an α, β-monoethylenically unsaturated carboxylic acid ester, the proportion of the α, β-monoethylenically unsaturated carboxylic acid ester to the copolymer is not less than 2 mol % and not more than 95 mol %.

2. A glycol dispersion of claim 1, wherein the calcium carbonate to be surface-treated is precipitated calcium carbonate meeting the requirements described below in (a) and (b), said surface-treated precipitated calcium carbonate is used as wet grinding material and a glycol slurry consisting of said wet grinding material and glycol is wet-ground under the conditions described below in (2); wherein (a) the primary particle size $D_1$ calculated by the following formula (1) from the specific surface area $S_1$ measured by the BET method is not less than 0.1 μm:

$$Dx = 60,000/2.7Sx \tag{1}$$

wherein, $Dx$ is the average particle size (μm) of precipitated calcium carbonate calculated from the specific surface area measured by the BET method; and $Sx$ is the specific surface area (cm²/g) of precipitated calcium carbonate measured by the BET method;

(b) the ratio ($R_1$) of the 50% weight average particle size $d_1$ of particle size distribution measured in an aqueous medium by the use of Light Transmission Centrifugal Precipitation-Type Particle Size Distribution Measuring Device (manufactured by Shimazu Seisakusho Ltd.) to the aforesaid $D_1$ satisfies the following formula (2):

$$R_1 = d_1/D_1 \leq 7 \tag{2};$$

(c) the ratio ($R_2$) of the aforesaid primary particle size $D_1$ to the primary particle size $D_2$ calculated by the aforesaid formula (1) from the specific surface area $S_2$ of wetground precipitated calcium carbonate measured by the BET method satisfies the following formula (3):

$$R_2 = D_1/D_2, 1 < R_2 \leq 10 \tag{3}.$$

3. A glycol dispersion of claim 1, wherein the amount of the surface treating agent is not less than 0.01 weight % and not more than 30 weight % (as 100% pure) based on calcium carbonate.

* * * * *